US012649281B2

(12) United States Patent　　(10) Patent No.:　US 12,649,281 B2
Kothari et al.　　　　　　　　　(45) Date of Patent:　　　Jun. 9, 2026

(54) AGENT MAPS

(71) Applicant: Peridot Print LLC, Palo Alto, CA (US)

(72) Inventors: Sunil Kothari, Fremont, CA (US); Jacob Tyler Wright, Escondido, CA (US); Maria Fabiola Leyva Mendivil, Zapopan (MX); Jun Zeng, Los Gatos, CA (US)

(73) Assignee: Peridot Print LLC, Palo Alto, CA (US)

( * ) Notice: Subject to any disclaimer, the term of this patent is extended or adjusted under 35 U.S.C. 154(b) by 976 days.

(21) Appl. No.: 17/576,286

(22) Filed: Jan. 14, 2022

(65) Prior Publication Data

US 2023/0226768 A1　Jul. 20, 2023

(51) Int. Cl.
　*G06N 20/00*　　(2019.01)
　*B29C 64/393*　　(2017.01)
　*G06T 3/4046*　　(2024.01)
　*B33Y 10/00*　　(2015.01)
　*B33Y 50/02*　　(2015.01)
(52) U.S. Cl.
　CPC ...........　*B29C 64/393* (2017.08); *G06N 20/00* (2019.01); *G06T 3/4046* (2013.01); *B33Y 10/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2017/0330319 A1* | 11/2017 | Xu | G06T 7/70 |
| 2019/0171871 A1* | 6/2019 | Zhang | G06V 40/103 |
| 2020/0298499 A1* | 9/2020 | Gupta | B33Y 50/00 |
| 2021/0217188 A1* | 7/2021 | Gopalkrishna | G06N 20/00 |

FOREIGN PATENT DOCUMENTS

WO　　WO-2020251550 A1 * 12/2020　.............. B22F 10/85

* cited by examiner

*Primary Examiner* — Xuyang Xia
(74) *Attorney, Agent, or Firm* — Michael Dryja

(57) ABSTRACT

Examples of methods are described. In some examples, a method includes generating, using a first branch of a machine learning model, a first agent map based on a layer image. In some examples, the method includes generating, using a second branch of the machine learning model, a second agent map. In some examples, the first agent map and the second agent map indicate printing locations for different agents.

16 Claims, 8 Drawing Sheets

100

102 — Generate, using a first branch of a machine learning model, a first agent map based on a layer image 104 — Generate, using a second branch of the machine learning model, a second agent map, where the first agent map and the second agent map indicate printing locations for different agents Apparatus 324

Processor 328

Memory 326

Image Data 336

Agent Map Generation Instructions 340

Computer-Readable Medium _448_

Machine Learning Model Instructions _450_

Downscaled Image Data _452_

FIG. 4

AGENT MAPS

BACKGROUND

Three-dimensional (3D) solid objects may be produced from a digital model using additive manufacturing. Additive manufacturing may be used in rapid prototyping, mold generation, mold master generation, and short-run manufacturing. Additive manufacturing involves the application of successive layers of build material. In some additive manufacturing techniques, the build material may be cured or fused.

BRIEF DESCRIPTION OF THE DRAWINGS

FIG. 4 is a block diagram illustrating an example of a computer-readable medium for agent map generation;

DETAILED DESCRIPTION

Figure 1:
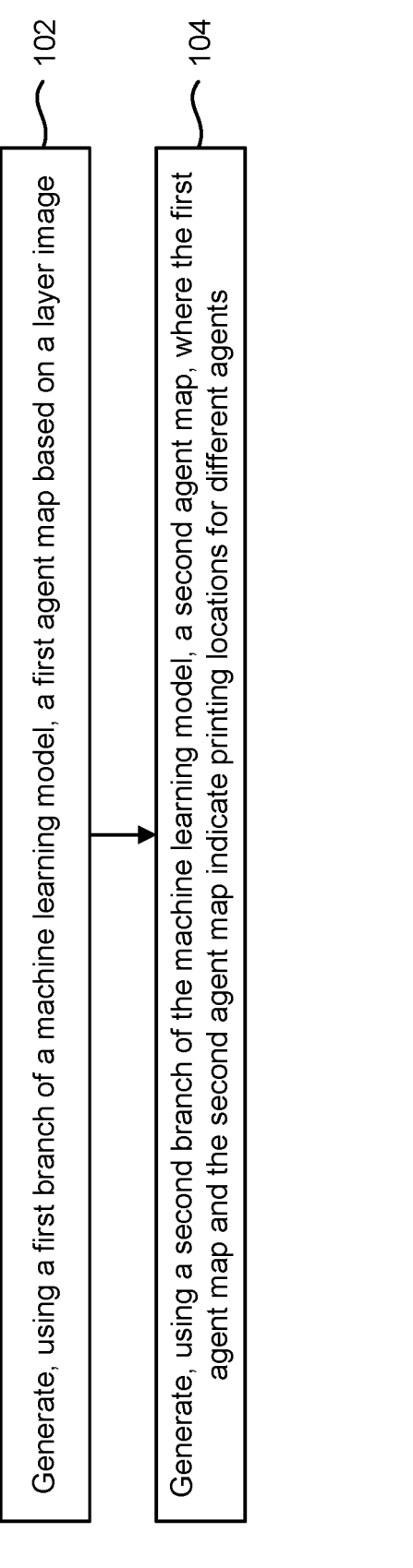
FIG. 1 is a flow diagram illustrating an example of a method for agent map generation.

Additive manufacturing may be used to manufacture three-dimensional (3D) objects. 3D printing is an example of additive manufacturing. Some examples of 3D printing may selectively deposit agents (e.g., droplets). An agent is a printable substance (e.g., fluid, solution, liquid, particles, etc.). In some examples, agents may be deposited at a pixel level to enable control over voxel-level energy deposition. For instance, thermal energy may be projected over material in a build area, where a phase change (for example, melting and solidification) in the material may occur depending on the voxels where the agents are deposited. Examples of agents include fusing agent and detailing agent. A fusing agent is an agent that causes material to fuse when exposed to energy. A detailing agent is an agent that reduces or prevents fusing.

A voxel is a representation of a location in a 3D space. For example, a voxel may represent a volume or component of a 3D space. For instance, a voxel may represent a volume that is a subset of the 3D space. In some examples, voxels may be arranged on a 3D grid. For instance, a voxel may be rectangular or cubic in shape. Examples of a voxel size dimension may include 25.4 millimeters (mm)/150≈170 microns for 150 dots per inch (DPI), 490 microns for 50 DPI, 2 mm, etc. A set of voxels may be utilized to represent a build volume.

A build volume is a volume in which an object or objects may be manufactured. A "build" may refer to an instance of 3D manufacturing. For instance, a build may specify the location(s) of object(s) in the build volume. A layer is a portion of a build. For example, a layer may be a cross section (e.g., two-dimensional (2D) cross section) of a build.

In some examples, a layer may refer to a horizontal portion (e.g., plane) of a build volume. In some examples, an "object" may refer to an area and/or volume in a layer and/or build indicated for forming an object. A slice may be a portion of a build. For example, a build may undergo slicing, which may extract a slice or slices from the build. A slice may represent a cross section of the build. A slice may have a thickness. In some examples, a slice may correspond to a layer.

Fusing agent and/or detailing agent may be used in 3D manufacturing (e.g., Multi Jet Fusion (MJF)) to provide selectivity to fuse objects and/or ensure accurate geometry. For example, fusing agent may be used to absorb lamp energy, which may cause material to fuse in locations where the fusing agent is applied. Detailing agent may be used to modulate fusing by providing a cooling effect at the interface between an object and material (e.g., powder). Detailing agent may be used for interior features (e.g., holes), corners, and/or thin boundaries. An amount or amounts of agent (e.g., fusing agent and/or detailing agent) and/or a location or locations of agent (e.g., fusing agent and/or detailing agent) may be determined for manufacturing an object or objects. For instance, an agent map may be determined. An agent map is data (e.g., an image) that indicates a location or locations to apply agent. For instance, an agent map may be utilized to control an agent applicator (e.g., nozzle(s), print head(s), etc.) to apply agent to material for manufacturing. In some examples, an agent map may be a two-dimensional (2D) array of values indicating a location or locations for placing agent on a layer of material.

In some approaches, determining agent placement may be based on various factors and functions. Due to computational complexity, determining agent placement may use a relatively large amount of resources and/or take a relatively long period of time. Some examples of the techniques described herein may be helpful to accelerate agent placement determination. For instance, machine learning techniques may be utilized to determine agent placement.

Machine learning is a technique where a machine learning model is trained to perform a task or tasks based on a set of examples (e.g., data). Training a machine learning model may include determining weights corresponding to structures of the machine learning model. Artificial neural networks are a kind of machine learning model that are structured with nodes, model layers, and/or connections. Deep learning is a kind of machine learning that utilizes multiple layers. A deep neural network is a neural network that utilizes deep learning.

Examples of neural networks include convolutional neural networks (CNNs) (e.g., basic CNN, deconvolutional neural network, inception module, residual neural network, etc.) and recurrent neural networks (RNNs) (e.g., basic RNN, multi-layer RNN, bi-directional RNN, fused RNN, clockwork RNN, etc.). Some approaches may utilize a variant or variants of RNN (e.g., Long Short Term Memory Unit (LSTM), convolutional LSTM (Conv-LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths of a neural network or neural networks may be utilized in accordance with some examples of the techniques described herein.

In some examples of the techniques described herein, deep learning may be utilized to accelerate agent placement determination. Some examples may perform procedures in parallel using a graphics processing unit (GPU) or GPUs. In some examples, a build with approximately 4700 layers may be processed with a GPU to generate fusing agent maps and detailing agent maps at 18.75 dots per inch (DPI) with 80 micrometer (μm) slices in 6 mins (or approximately 10 milliseconds (ms) per layer for fusing agent maps and detailing agent maps). Some examples of the techniques described herein may include deep learning techniques based on a convolutional recurrent neural network to map spatio-temporal relationships used in determining fusing agent maps and/or detailing agent maps. For example, a machine learning model (e.g., deep learning model) may be utilized to map a slice (e.g., slice image) to a fusing agent map and a detailing agent map. In some examples, an agent map may be expressed as a continuous tone (contone) image.

Some examples of the techniques described herein may utilize deep learning (e.g., convolutional recurrent neural network(s)) to map spatio-temporal relationships utilized to determine an agent map(s) (e.g., fusing agent map and/or detailing agent map). For instance, a deep learning model may be utilized to map a slice image to a fusing agent map and a detailing agent map (e.g., images). Some examples of the architectures described herein may enhance prediction accuracy (e.g., 96-99% for fusing agent and 84-91% for detailing agent) for polyamide 12 (PA 12) and polyamide 11 (PA 11).

While plastics (e.g., polymers) may be utilized as a way to illustrate some of the approaches described herein, some the techniques described herein may be utilized in various examples of additive manufacturing. For instance, some examples may be utilized for plastics, polymers, semi-crystalline materials, metals, etc. Some additive manufacturing techniques may be powder-based and driven by powder fusion. Some examples of the approaches described herein may be applied to area-based powder bed fusion-based additive manufacturing. Some examples of manufacturing may include Stereolithography (SLA), Multi Jet Fusion (MJF), Metal Jet Fusion, Selective Laser Melting (SLM), Selective Laser Sintering (SLS), liquid resin-based printing, etc. Some examples of the approaches described herein may be applied to additive manufacturing where agents carried by droplets are utilized for voxel-level thermal modulation.

In some examples, "powder" may indicate or correspond to particles. In some examples, an object may indicate or correspond to a location (e.g., area, space, etc.) where particles are to be sintered, melted, or solidified. For example, an object may be formed from sintered or melted powder.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for agent map generation. For example, the method 100 may be performed to produce an agent map or agent maps (e.g., fusing agent map and/or detailing agent map). The method 100 and/or an element or elements of the method 100 may be performed by an apparatus (e.g., electronic device). For example, the method 100 may be performed by the apparatus 324 described in relation to FIG. 3.

The apparatus may generate 102, using a first branch of a machine learning model, a first agent map based on a layer image. A layer image is an image corresponding to a layer or layers of a build. A layer image or images may be utilized as an input to the machine learning model. Examples of layer images may include two-dimensional (2D) images, slices, downscaled slices, downscaled images, etc. For instance, the apparatus may slice (e.g., determine a cross-section of) a build to produce slices and/or may receive slices from another device.

In some examples, the apparatus may downscale a slice of a 3D build to produce a downscaled image. For example, the apparatus may down-sample, interpolate (e.g., interpolate using bilinear interpolation, bicubic interpolation, Lanczos kernels, nearest neighbor interpolation, and/or Gaussian kernel, etc.), decimate, filter, average, and/or compress, etc., the slice of a 3D build to produce the downscaled image. For instance, a slice of the 3D build may be an image. In some examples, the slice may have a relatively high resolution (e.g., print resolution and/or 3712×4863 pixels (px), etc.). The apparatus may downscale the slice by removing pixels, performing sliding window averaging on the slice, etc., to produce the downscaled image. In some examples, the slice may be down sampled to an 18.75 DPI image (e.g., 232×304 px). In some examples, the apparatus may downscale multiple slices. For instance, the apparatus may downscale one, some, or all slices corresponding to a build.

In some examples, the apparatus may determine a sequence or sequences of slices, layers, and/or downscaled images. A sequence is a set of slices, layers, and/or downscaled images in an order. For instance, a sequence of downscaled images may be a set of downscaled images in a positional (e.g., height, z-axis, etc.) order. For instance, a sequence may have a size (e.g., 10 consecutive slices, layers, and/or downscaled images).

In some examples, the apparatus may determine a lookahead sequence, a current sequence, and/or a lookback sequence. A current sequence may be a sequence at or including a current position (e.g., a current processing position, a current downscaled image, a current slice, and/or a current layer, etc.). A lookahead sequence is a set of slices, layers, and/or downscaled images ahead of (e.g., above) the current sequence (e.g., 10 consecutive slices, layers, and/or downscaled images ahead of the current sequence). A lookback sequence is a set of slices, layers, and/or downscaled images before (e.g., below) the current sequence (e.g., 10 consecutive slices, layers, and/or downscaled images before the current sequence). In some examples, the downscaled image or images may be the layer image utilized as input to the machine learning model.

A branch of a machine learning model is a portion of a machine learning model that is separate from another portion (e.g., another branch) of the machine learning model. For instance, a first branch of a machine learning model may be separate from a second branch of the machine learning model. In some examples, a first branch of a machine learning model may include a parameter(s), node(s), layer(s), connection(s), etc., separate from a parameter(s), node(s), layer(s), connection(s), etc., of a second branch. For example, a first branch may include a parameter(s), node(s), layer(s), connection(s), etc., that is (or are) exclusive to the first branch. In some examples, a branch may not include a lateral connection (e.g., connection between nodes in a layer) to another branch and/or may not include a downstream connection to another branch (e.g., connection to a subsequent layer of another branch).

In some examples, the layer image may be provided to the machine learning model, which may predict and/or infer the first agent map using the first branch of the machine learning model. For instance, the machine learning model may be trained to determine (e.g., predict, infer, etc.) an agent map or agent maps corresponding to the layer image. In some examples, the first agent map is a fusing agent map. For instance, the first agent map may indicate a location or locations where fusing agent is to be applied to enable fusing of material (e.g., powder) to manufacture an object or objects. In some examples, the lookahead sequence, the current sequence, and the lookback sequence may be provided to the machine learning model. For instance, the machine learning model may determine an agent map or agent maps based on the lookahead sequence, the current sequence, and/or the lookback sequence (e.g., 30 layer images, slices, and/or downscaled images).

The apparatus may generate 104, using a second branch of the machine learning model, a second agent map. In some examples, the second agent map is a detailing agent map. For instance, the second agent map may indicate a location or locations where detailing agent is to be applied to prevent and/or reduce fusing of material (e.g., powder).

In some examples, the first agent map and the second agent map may indicate printing locations for different agents. For instance, the first agent map may be a fusing agent map and the second agent map may be a detailing agent map. While fusing agent and detailing agent are given in some examples of the techniques described herein, another agent or agents (e.g., coloring agent, binding agent, etc.) may be utilized in some examples of the techniques described herein.

In some examples, the first branch includes a first parameter (e.g., first weight) to generate the first agent map, and the second branch includes a second parameter (e.g., second weight) to generate the second agent map, where the second parameter is separate from the first parameter. In some examples, the first parameter may be separate from the second parameter by being located on a separate path from a path of the second parameter. In some examples, the first parameter may be separate from the second parameter by being independent from the second parameter. In some examples, the first parameter may be separate from the second parameter by being utilized to produce a separate agent map. For instance, the first agent map may be generated (e.g., determined, inferred, predicted, etc.) based on the first branch (e.g., first parameter) and independently of (e.g., not based on) the second branch (e.g., second parameter), and/or the second agent map may be generated (e.g., determined, inferred, predicted, etc.) based on the second branch (e.g., second parameter) and independently of (e.g., not based on) the first branch (e.g., second parameter).

In some examples, the machine learning model includes a trunk including a shared parameter (e.g., weight) to generate the first agent map and the second agent map. A trunk of a machine learning model is a shared portion of the machine learning model. For instance, a shared parameter of the trunk may be utilized to generate (e.g., determine, infer, predict) the first agent map and the second agent map. In some examples, a structure of the machine learning model may have a shared path (e.g., shared parameter(s)) in a trunk and split paths (e.g., separate parameter(s)) in branches. An example of a machine learning model including a trunk and branches is described in relation to FIG. 8.

In some examples, the different branches of the machine learning model may be utilized to generate different agent maps. For instance, a fusing agent map may approximately follow the shapes in a slice, while a detailing agent map may have an increased dependency on previous layers and upcoming layers. For example, an object may have a two-layer offset before placement of fusing agent. An object may have a three-layer offset after an object starts for placement of detailing agent in slices. When the object ends at a layer, fusing agent placement may stop beyond the object while the detailing agent placement may continue for a quantity of slices or layers (e.g., 5, 10, 11, 15, etc.) before stopping. In some examples, an offset may span a sequence, may be within a sequence, or may extend beyond a sequence.

In some examples, the amount of detailing agent usage may vary more with layers relative to fusing agent usage. For instance, some spatial dependencies may determine the detailing agent usage such as the lowering of detailing agent contone values near the boundary of the build volume or on the inside of objects such as holes and corners. Short-term (e.g., in-sequence) and long-term (e.g., out-of-sequence) dependencies may determine the contone values for fusing agent and/or detailing agent. Some examples of the techniques described herein may provide machine learning (e.g., deep learning) architectures that model the long-term and short-term dependencies and/or kernel computations used to determine contone values.

In some examples, the apparatus may apply a perimeter mask to the second agent map (e.g., detailing agent map) to produce a masked agent map (e.g., masked detailing agent map). A perimeter mask is a set of data (e.g., an image) with reduced values along a perimeter (e.g., outer edge of the image). For instance, a perimeter mask may include higher values in a central portion and declining values in a perimeter portion of the perimeter mask. The perimeter portion may be a range from the perimeter (e.g., 25 pixels along the outer edge of the image). In the perimeter portion, the values of the perimeter mask may decline in accordance with a function (e.g., linear function, slope, curved function, etc.). In some examples, applying the perimeter mask to an agent map may maintain central values of the agent map while reducing values of the agent map corresponding to the perimeter portion. In some examples, applying the perimeter mask to the agent map may include multiplying (e.g., pixel-wise multiplying) the values of the perimeter mask with the values of the agent map. Applying the perimeter mask to the second agent map may produce the masked second agent map (e.g., masked detailing agent map).

In some examples, the machine learning model may be trained based on a loss function or loss functions. A loss function is a function that indicates a difference, error, and/or loss between a target output (e.g., ground truth) and a machine learning model output (e.g., agent map). For example, a loss function may be utilized to calculate a loss or losses during training. The loss(es) may be utilized to adjust the weights of the machine learning model to reduce and/or eliminate the loss(es). In some cases, a portion of a build may correspond to powder or unfused material. Other portions of a build (e.g., object edges, regions along object edges, etc.) may more significantly affect manufacturing quality. Accordingly, it may be helpful to utilize a loss function or loss functions that produce a loss or losses that focus on (e.g., are weighted towards) object edges and/or regions along object edges. Some examples of the techniques described herein may utilize a masked ground truth image or images to emphasize losses to object edges and/or regions along object edges.

In some examples, the machine learning model is trained based on a masked ground truth image. Examples of ground truth images include ground truth agent maps (e.g., ground truth fusing agent map and/or ground truth detailing agent map). A ground truth agent map is an agent map (e.g., a target agent map determined through computation and/or that is manually determined) that may be used for training. A masked ground truth image (e.g., masked ground truth agent map) is a ground truth image that has had masking (e.g., masking operation(s)) applied. In some examples of the techniques described herein, a masked ground truth image may be determined based on an erosion and/or dilation operation on a ground truth image. For example, a masked ground truth agent map may be determined based on an erosion and/or dilation operation on a ground truth agent map. A dilation operation may enlarge a region from an object edge (e.g., expand an object). An erosion operation may reduce a region from an object edge (e.g., reduce a non-object region around an object). In some examples, a dilation operation may be applied to a ground truth fusing agent map to produce a masked ground truth fusing agent map. In some examples, an erosion operation may be applied to a ground truth detailing agent map to produce a masked ground truth detailing agent map. In some examples, a masked ground truth image may be binarized. For instance, a threshold or thresholds may be applied to the masked ground truth image (e.g., masked ground truth agent map) to binarize the masked ground truth image (e.g., set each pixel to one of two values). For instance, the erosion and/or dilation operation(s) may produce images with a range of pixel intensities (in the masked ground truth image or agent map, for example). A threshold or thresholds may be utilized to set each pixel to a value (e.g., one of two values). For instance, if a pixel intensity of a pixel is greater than or equal to a threshold, that pixel value may be set to a '1' or may be set to '0' otherwise.

In some examples, the machine learning model may be trained using a loss function that is based on a masked ground truth agent map or agent maps. For instance, a masked ground truth agent map or agent maps may be a factor or factors in the loss function. In some examples, the loss function may be expressed in accordance with an aspect or aspects of the following approach.

In some examples, $IMG_{DA}$ may denote a predicted detailing agent map, $IMG_{FA}$ may denote a predicted fusing agent map, $IMG_{FA-GT}$ may denote a ground truth fusing agent map, and $IMG_{DA-GT}$ may denote a ground truth detailing agent map, respectively, for a given slice or layer. A masked agent map is denoted with '~'. For example, a masked ground truth fusing agent map is denoted as $\widetilde{IMG}_{FA-GT}$. In some examples, the masked ground truth fusing agent map is obtained by applying an image dilation operation with a kernel (e.g., (5,5) kernel). In some examples, the masked ground truth detailing agent map is obtained by subtracting the result of dilation from the result of erosion on a kernel (e.g., (5,5) kernel). In some examples, the agent maps (e.g., images) may have the same dimensions (e.g., x, y dimensions). In some examples, the loss function (e.g., a loss sum) is an addition, where weights may determine the fusing agent versus detailing agent contribution to the overall loss.

An example of the loss function is given in Equation (1).

$$Loss = (L_{FA} + L_{FA\_M}) + (L_{DA} + L_{DA\_M}) \tag{1}$$

In Equation (1), $L_{FA}$ is a mean squared error (MSE) between a predicted fusing agent map and a ground truth fusing agent map, $L_{FA\_M}$ is an MSE between a masked predicted fusing agent map and a masked ground truth fusing agent map, $L_{DA}$ is an MSE between a predicted detailing agent map and a ground truth detailing agent map, and $L_{DA\_M}$ is an MSE between a masked predicted detailing agent map and a masked ground truth detailing agent map. $L_{FA}$ may be a fusion agent loss or loss component, $L_{DA}$ may be a detailing agent loss or loss component, $L_{FA\_M}$ may be a masked fusing agent loss or loss component, and/or $L_{DA\_M}$ may be a masked detailing agent loss or loss component. In some examples, the machine learning model may be trained using a loss function with equal weighting between the first branch and the second branch. For instance, $(L_{FA} + L_{FA\_M})$ may correspond to the first branch (e.g., fusing agent map generation) and $(L_{DA} + L_{DA\_M})$ may corresponding to the second branch, where each term is equally weighted. In some examples, the branches may have unequal weighting. For instance, $w_f$ may be a weight (for a fusing agent component of the loss, for instance), $w_d$ is a weight (for a detailing agent component loss, for instance), and $w_f + w_d = 1$, where the loss may be expressed as $$Loss = w_f*(L_{FA} + L_{FA\_M}) + w_d*(L_{DA} + L_{DA\_M}).$$

In some examples, $L_{FA}$ may be expressed and/or determined in accordance with Equation (2).

$$L_{FA} = \frac{1}{n*m} \sum_{i=1}^{n} \sum_{j=1}^{m} (p_{i,j} - q_{i,j})^2, \text{ where} \tag{2}$$

$$p_{i,j} \in IMG_{FA} \text{ and } q_{i,j} \in IMG_{FA-GT}$$

In some examples, $L_{DA}$ may be expressed and/or determined in accordance with Equation (3).

$$L_{DA} = \frac{1}{n*m} \sum_{i=1}^{n} \sum_{j=1}^{m} (p_{i,j} - q_{i,j})^2, \text{ where} \tag{3}$$

$$p_{i,j} \in IMG_{DA} \text{ and } q_{i,j} \in IMG_{DA-GT}$$

In some examples, $L_{FA\_M}$ may be expressed and/or determined in accordance with Equation (4).

$$L_{FA\_M} = \frac{1}{a} \sum_{i=1}^{n} \sum_{j=1}^{m} (f(p_{i,j}) - f(q_{i,j}))^2, \text{ where} \tag{4}$$

$$p_{i,j} \in \widetilde{IMG}_{FA}, q_{i,j} \in \widetilde{IMG}_{FA-GT},$$

$$f(p_{i,j}) = \begin{cases} p_{i,j} & \text{if } (i, j) \in \{(k, p) \mid p_{k,p} \in \widetilde{IMG}_{FA-GT} \text{ and } p_{k,p} > T_{FA}\} \\ 0, & \text{otherwise} \end{cases},$$

and $$a = |\{(k, p) | p_{k,p} \in \widetilde{IMG}_{FA-GT} \text{ and } p_{k,p} >$$

$$T_{FA} \text{ and } (f(p_{k,p}) - f(q_{k,p})) != 0)\}|, \text{ where}$$

$$a \leq n*m$$

In Equation (4), a denotes a size of a set of pixel coordinates (k,p), such that the pixels coordinates belong to a masked image, the pixel intensity is above a threshold $T_{FA}$, and a difference of pixel intensity in the predicted image (e.g., predicted fusing agent map) and ground truth image (e.g., fusing agent ground truth agent map) is non-zero. In some examples, averaging may be performed over non-zero difference masked and/or thresholded pixels (without averaging over other pixels, for instance). In some examples, the threshold $T_{FA}=20.4$ or another value (e.g., 18, 19.5, 20, 21.5, 22, etc.). In some examples, the function $f(\ )$ may choose a pixel intensity as 0 or a pixel value (e.g., $p_{k,p}$, $q_{k,p}$). For instance, the function $f(\ )$ may choose a pixel intensity as 0 or a pixel value based on a ground truth image (e.g., ground truth agent map) with an applied mask (that may be based on the ground truth image, for instance) and the threshold.

In some examples, $L_{DA\_M}$ may be expressed and/or determined in accordance with Equation (5).

$$L_{DA\_M} = \frac{1}{a}\sum\nolimits_{i=1}^{n}\sum\nolimits_{j=1}^{m}(f(p_{i,j}) - f(q_{i,j}))^2, \text{ where} \quad (5)$$

$$p_{i,j} \in \widehat{IMG}_{DA}, q_{i,j} \in \widehat{IMG}_{DA-GT},$$

$$f(p_{i,j}) = \begin{cases} p_{i,j} \text{ if } (i,j) \in \{(k,p)\,|\,p_{k,p} \in \widehat{IMG}_{DA-GT} \text{ and } p_{k,p} > T_{DA}\} \\ 0, \text{ otherwise} \end{cases},$$

and $$a = |\{(k,p)|p_{k,p} \in \widehat{IMG}_{DA-GT} \text{ and } p_{k,p} >$$

$$T_{DA} \text{ and } (f(p_{k,p}) - f(q_{k,p})) \mathrel{!}= 0)\}|, \text{ where}$$

$$a \leq n*m$$

In Equation (5), a denotes a size of a set of pixel coordinates (k,p), such that the pixels coordinates belong to a masked image, the pixel intensity is above a threshold $T_{DA}$, and a difference of pixel intensity in the predicted image (e.g., predicted detailing agent map) and ground truth image (e.g., detailing agent ground truth agent map) is non-zero. In some examples, averaging may be performed over non-zero difference masked and/or thresholded pixels (without averaging over other pixels, for instance). In some examples, the threshold $T_{DA}=20.4$ or another value (e.g., 18, 19.5, 20, 21.5, 22, etc.). $T_{DA}$ may be the same as $T_{FA}$ or different. In some examples, the function $f(\ )$ may choose a pixel intensity as 0 or a pixel value (e.g., $p_{k,p}$, $q_{k,p}$). For instance, the function $f(\ )$ may choose a pixel intensity as 0 or a pixel value based on a ground truth image (e.g., ground truth agent map) with an applied mask (that may be based on the ground truth image, for instance) and the threshold. In some examples, a mask may be selected based on a manufacturing powder type. For instance, a unity mask or no mask may be selected for PA 11, whereas another mask (e.g., a non-uniform mask) may be selected for PA 12.

In some examples, the machine learning model may include a bidirectional wrapper or wrappers. A bidirectional wrapper is an architecture where nodes and/or layers are connected in opposite directions. An example of a bidirectional wrapper is given in FIG. 6. In some examples, the first branch may include a first bidirectional wrapper and/or the second branch may include a second bidirectional wrapper. In some examples, a trunk of the machine learning model may include a bidirectional wrapper after a second layer (e.g., after an input layer and a next layer).

In some examples, an operation or operations of the method 100 may be repeated to determine multiple agent maps corresponding to multiple slices and/or layers of a build. In some examples, the method 100 may include an operation or operations described in relation to one, some, or all of FIGS. 2-8.

Figure 2:
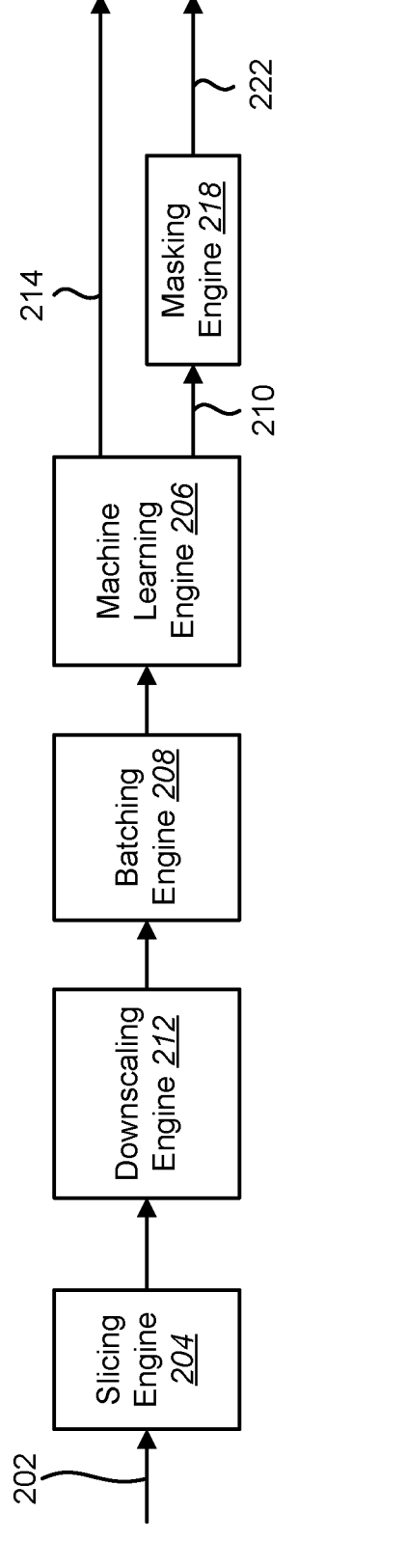
FIG. 2 is a block diagram illustrating examples of engines for agent map generation.

FIG. 2 is a block diagram illustrating examples of engines for agent map generation. As used herein, the term "engine" refers to circuitry (e.g., analog or digital circuitry, a processor, such as an integrated circuit, or other circuitry, etc.) or a combination of instructions (e.g., programming such as machine- or processor-executable instructions, commands, or code such as a device driver, programming, object code, etc.) and circuitry. Some examples of circuitry may include circuitry without instructions such as an application specific integrated circuit (ASIC), a Field Programmable Gate Array (FPGA), etc. A combination of circuitry and instructions may include instructions hosted at circuitry (e.g., an instruction module that is stored at a processor-readable memory such as random-access memory (RAM), a hard-disk, or solid-state drive, resistive memory, or optical media such as a digital versatile disc (DVD), and/or executed or interpreted by a processor), or circuitry and instructions hosted at circuitry.

In some examples, the engines may include a slicing engine 204, downscaling engine 212, batching engine 208, machine learning engine 206, and/or a masking engine 218. In some examples, one, some, or all of the operations described in relation to FIG. 5 may be performed by the apparatus 324 described in relation to FIG. 3. For instance, instructions for an operation or operations described (e.g., slicing, downscaling, batching, machine learning model execution, masking, etc.) may be stored in memory and executed by a processor in some examples. In some examples, an operation or operations (e.g., slicing, downscaling, batching, machine learning model execution, masking, etc.) may be performed by another apparatus. For instance, slicing may be carried out on a separate apparatus and sent to the apparatus. In some examples, one, some, or all of the operations described in relation to FIG. 2 may be performed in the method 100 described in relation to FIG. 1.

Build data 202 may be obtained. For example, the build data 202 may be received from another device and/or generated. In some examples, the build data 202 may include and/or indicate geometrical data. Geometrical data is data indicating a model or models of an object or objects. An object model is a geometrical model of an object or objects. An object model may specify shape and/or size of a 3D object or objects. In some examples, an object model may be expressed using polygon meshes and/or coordinate points. For example, an object model may be defined using a format or formats such as a 3D manufacturing format (3MF) file format, an object (OBJ) file format, computer aided design (CAD) file, and/or a stereolithography (STL) file format, etc. In some examples, the geometrical data indicating a model or models may be received from another device and/or generated. For instance, the apparatus may receive a file or files of geometrical data and/or may generate a file or files of geometrical data. In some examples, the apparatus may generate geometrical data with model(s) created on the apparatus from an input or inputs (e.g., scanned object input, user-specified input, etc.).

The slicing engine 204 may perform slicing on the build data 202. For example, the slicing engine 204 may generate a slice or slices (e.g., 2D slice(s)) corresponding to the build data 202 as described in relation to FIG. 1. For instance, the apparatus (or another device) may slice the build data 202, which may include and/or indicate a 3D model of an object or objects. In some examples, slicing may include generating a set of 2D slices corresponding to the build data 202. In some approaches, the build data 202 may be traversed along an axis (e.g., a vertical axis, z-axis, or other axis), where each slice represents a 2D cross section of the 3D build data 202. For example, slicing the build data 202 may include identifying a z-coordinate of a slice plane. The z-coordinate of the slice plane can be used to traverse the model to identify a portion or portions of the model intercepted by the slice plane. In some examples, a slice may have a size and/or resolution of 3712×4863 px. In some examples, the slice(s) may be provided to the downscaling engine 212.

The downscaling engine 212 may produce a downscaled image or images. In some examples, the downscaling engine 212 may produce the downscaled image(s) based on the build data 202 and/or the slice(s) provided by slicing engine 204. For example, the downscaling engine 212 may down-sample, filter, average, decimate, etc. the slice(s) to produce the downscaled image(s) as described in relation to FIG. 1. For instance, the slice(s) may be at print resolution (e.g., 300 DPI or 3712×4863 px) and may be down-sampled to a lower resolution (e.g., 18.75 DPI or 232×304 px). The downscaled image(s) may be reduced-size and/or reduced-resolution versions of the slice(s). In some examples, the downscaled image(s) may have a resolution and/or size of 232×304 px. The downscaled image(s) may be provided to batching engine 208.

The batching engine 208 may group the downscaled image(s) into a sequence or sequences, a sample or samples, and/or a batch or batches. For example, a sequence may be a group of down-sampled images (e.g., slices and/or layers). A sample is a group of sequences. For instance, multiple sequences (e.g., in-order sequences) may form a sample. A batch is a group of samples. For example, a batch may include multiple samples. The batching engine 208 may assemble sequence(s), sample(s), and/or batch(es). In some examples, the batching engine 208 may sequence and batch the downscaled slices into samples and generate ten-layer lookahead and lookback samples. For instance, lookahead sample batches may have a sample size of two and a sequence size of ten, current sample batches may have a sample size of two and a sequence size of ten, and/or lookback sample batches may have a sample size of two and a sequence size of ten. For instance, a lookahead sequence may include ten consecutive layers ahead of the current sequence and/or a lookback sequence may include ten consecutive layers before the current sequence. The sequence(s), sample(s), and/or batch(es) may be provided to the machine learning engine 206. For instance, inputs may be passed to the machine learning engine 206 as three separate channels.

The machine learning engine 206 may produce a predicted fusing agent map 214 and a predicted detailing agent map 210 (e.g., unmasked detailing agent map). For instance, the machine learning engine 206 may execute a machine learning model including a first branch to produce a predicted fusing agent map 214 and a second branch to produce a predicted detailing agent map 210. In some examples, the machine learning engine 206 (e.g., deep learning engine) may use a sample as an input to generate agent maps corresponding to a sample. In some examples, the input for the machine learning engine 206 includes a three-channel image and the output of the machine learning engine 206 includes a two-channel image for each time increment. In some examples, the predicted fusing agent map 214 may have a size and/or resolution of 232×304 px. In some examples, the predicted detailing agent map 210 may have a size and/or resolution of 232×304 px. In some examples, the predicted detailing agent map 210 may be provided to the masking engine 218.

The masking engine 218 may apply a perimeter mask to the detailing agent map 210. For instance, the masking engine 218 may apply a perimeter mask (e.g., downscaled perimeter mask) with a size and/or resolution of 232×304 px to the detailing agent map 210. The masking engine 218 may produce a masked detailing agent map 222. In some examples, the masked detailing agent map 222 may have a size and/or resolution of 232×304 px.

Figure 3:
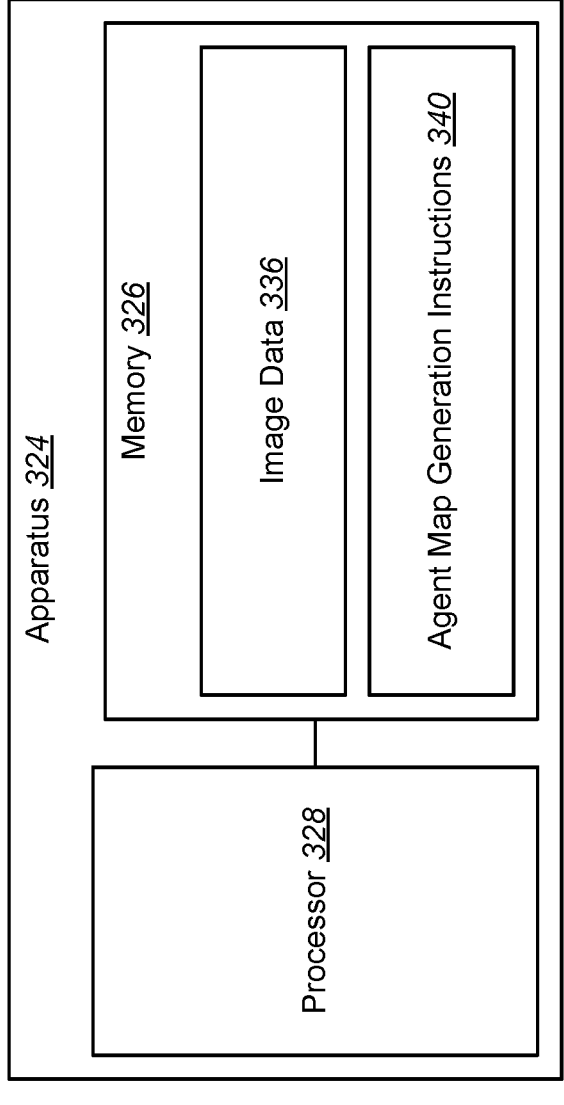
FIG. 3 is a block diagram of an example of an apparatus that may be used in agent map generation.

FIG. 3 is a block diagram of an example of an apparatus 324 that may be used in agent map generation. The apparatus 324 may be a computing device, such as a personal computer, a server computer, a printer, a 3D printer, a smartphone, a tablet computer, etc. The apparatus 324 may include and/or may be coupled to a processor 328 and/or a memory 326. In some examples, the apparatus 324 may be in communication with (e.g., coupled to, have a communication link with) an additive manufacturing device (e.g., a 3D printer). In some examples, the apparatus 324 may be an example of 3D printer. The apparatus 324 may include additional components (not shown) and/or some of the components described herein may be removed and/or modified without departing from the scope of the disclosure.

The processor 328 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 326. The processor 328 may fetch, decode, and/or execute instructions stored on the memory 326. In some examples, the processor 328 may include an electronic circuit or circuits that include electronic components for performing a functionality or functionalities of the instructions. In some examples, the processor 328 may perform one, some, or all of the aspects, elements, techniques, etc., described in relation to one, some, or all of FIGS. 1-8.

The memory 326 is an electronic, magnetic, optical, and/or other physical storage device that contains or stores electronic information (e.g., instructions and/or data). The memory 326 may be, for example, Random Access Memory (RAM), Electrically Erasable Programmable Read-Only Memory (EEPROM), a storage device, an optical disc, and/or the like. In some examples, the memory 326 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the memory 326 may be a non-transitory tangible machine-readable storage medium, where the term "non-transitory" does not encompass transitory propagating signals. In some examples, the memory 326 may include multiple devices (e.g., a RAM card and a solid-state drive (SSD)).

In some examples, the apparatus 324 may further include a communication interface through which the processor 328 may communicate with an external device or devices (not shown), for instance, to receive and store the information pertaining to an object or objects of a build or builds. The communication interface may include hardware and/or machine-readable instructions to enable the processor 328 to communicate with the external device or devices. The communication interface may enable a wired or wireless connection to the external device or devices. The communication interface may further include a network interface card and/or may also include hardware and/or machine-readable instructions to enable the processor 328 to communicate with various input and/or output devices, such as a keyboard, a mouse, a display, another apparatus, electronic device, computing device, printer, etc., through which a user may input instructions into the apparatus 324.

In some examples, the memory 326 may store image data 336. The image data 336 may be generated (e.g., predicted, inferred, produced, etc.) and/or may be obtained (e.g., received) from an external device. For example, the processor 328 may execute instructions (not shown in FIG. 3) to obtain object data, build data, slices, and/or layers, etc. In some examples, the apparatus 324 may receive image data 336 (e.g., build data, object data, slices, and/or layers, etc.) from an external device (e.g., external storage, network device, server, etc.).

In some examples, the image data 336 may include a layer image or images. For instance, the memory 326 may store the layer image(s). The layer image(s) may include and/or indicate a slice or slices of a model or models (e.g., 3D object model(s)) in a build volume. For instance, a layer image may indicate a slice of a 3D build. The apparatus 324 may generate the layer image(s) and/or may receive the layer image(s) from another device. In some examples, the memory 326 may include slicing instructions (not shown in FIG. 3). For example, the processor 328 may execute slicing instructions to perform slicing on the 3D build to produce a stack of slices.

The memory 326 may store agent map generation instructions 340. For example, the agent map generation instructions 340 may be instructions for generating an agent map or agent maps. In some examples, the agent map generation instructions 340 may include data defining and/or implementing a machine learning model or models. In some examples, the machine learning model(s) may include a neural network or neural networks. For instance, the agent map generation instructions 340 may define a node or nodes, a connection or connections between nodes, a network layer or network layers, and/or a neural network or neural networks. In some examples, the machine learning structures described herein may be examples of the machine learning model(s) defined by the agent map generation instructions 340.

In some examples, the agent map generation instructions 340 may include a machine learning model. The machine learning model may include a trunk, a first branch, and a second branch. For instance, the processor 328 may execute the machine learning model including the first branch to generate a first agent map based on the layer image(s), and the second branch to generate a second agent map based on the layer image(s). The machine learning model may include a trunk shared between the first branch and the second branch. For instance, the first branch and the second branch may bifurcate from the trunk. In some examples, the processor 328 may execute the agent map generation instructions 340 to generate, using a machine learning model, the first agent map and the second agent map based on the layer image(s). In some examples, the first agent map may indicate first locations to print fusing agent and the second agent map may indicate second locations to print detailing agent. For instance, the processor 328 may perform an operation or operations described in relation to FIG. 1 and/or FIG. 2 to produce a fusing agent map and/or a detailing agent map. The agent map(s) may be stored as image data 336 in the memory 326.

In some examples, the trunk includes shared parameters, and the first branch comprises first parameters that are separate from second parameters of the second branch. For instance, the shared parameters of the trunk may be utilized to produce the first agent map and the second agent map, the first parameters may be utilized to produce the first agent map (and not the second agent map), and the second parameters may be utilized to produce the second agent map (and not the first agent map).

In some examples, the processor 328 may execute the agent map generation instructions 340 to perform a rolling window of inferences within a sequence. The rolling window of inferences may provide multiple inferences for a given time increment. For instance, for two 10-layer sequences, a rolling window with a stride of 1 may generate eleven 10-layer sequences (e.g., two sequences of [[1,10], [11,20]] with a rolling window that may generate sequences of [[1,10], [2,11], [3,12], [4,13], [5,14], [6,15], [7,16], [8,17], [9,18], [10,19], [11,20]], where the first and second values in square brackets [ ] may denote the start and end layers of a sequence). In some examples, the processor 328 may utilize a heuristic (e.g., max, most frequent, and/or median, etc.) to choose one of the inferences as an agent map.

In some examples, the memory 326 may store operation instructions (not shown). In some examples, the processor 328 may execute the operation instructions to perform an operation based on the agent map(s). In some examples, the processor 328 may execute the operation instructions to utilize the agent map(s) to serve another device (e.g., printer controller). For instance, the processor 328 may print (e.g., control amount and/or location of agent(s) for) a layer or layers based on the agent map(s). In some examples, the processor 328 may drive model setting (e.g., the size of the stride) based on the agent map(s). In some examples, the processor 328 may feed the agent map for the upcoming layer to a thermal feedback control system to online compensate for an upcoming layer.

In some examples, the operation instructions may include 3D printing instructions. For instance, the processor 328 may execute the 3D printing instructions to print a 3D object or objects. In some examples, the 3D printing instructions may include instructions for controlling a device or devices (e.g., rollers, nozzles, print heads, thermal projectors, and/or fuse lamps, etc.). For example, the 3D printing instructions may use the agent map(s) to control a print head or heads to print an agent or agents in a location or locations specified by the agent map(s). In some examples, the processor 328 may execute the 3D printing instructions to print a layer or layers. In some examples, the processor 328 may execute the operation instructions to present a visualization or visualizations of the agent map(s) on a display and/or send the agent map(s) to another device (e.g., computing device, monitor, etc.).

Figure 4:
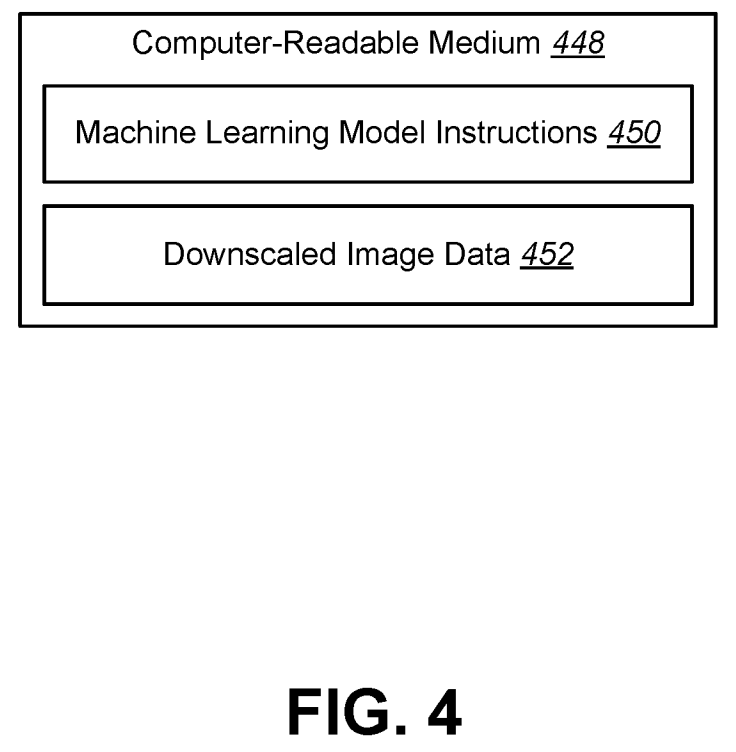

FIG. 4 is a block diagram illustrating an example of a computer-readable medium 448 for agent map generation. The computer-readable medium 448 is a non-transitory, tangible computer-readable medium. The computer-readable medium 448 may be, for example, RAM, EEPROM, a storage device, an optical disc, and the like. In some examples, the computer-readable medium 448 may be volatile and/or non-volatile memory, such as DRAM, EEPROM, MRAM, PCRAM, memristor, flash memory, and the like. In some examples, the memory 326 described in relation to FIG. 3 may be an example of the computer-readable medium 448 described in relation to FIG. 4. In some examples, the computer-readable medium 448 may include data (e.g., information and/or instructions) to cause a processor to perform one, some, or all of the operations, aspects, elements, etc., described in relation to one, some, or all of FIG. 1, FIG. 2, FIG. 3, FIG. 5, FIG. 6, FIG. 7, and/or FIG. 8.

The computer-readable medium 448 may include data (e.g., information and/or instructions). For example, the computer-readable medium 448 may include machine learning model instructions 450 and/or downscaled image data 452.

The machine learning model instructions 450 may include instructions when executed cause a processor of an electronic device to generate (e.g., predict) a first agent map
using a first branch of a machine learning model and a
second agent map using a second branch of the machine
learning model. In some examples, the first agent map and
the second agent map are based on a downscaled image of
a slice of a 3D build. For instance, the machine learning
model instructions 450 may include instructions to cause the
processor to generate a predicted first agent map (e.g., a
predicted fusing agent map) and a predicted second agent
map (e.g., a predicted detailing agent map). Generating the
first agent map and the second agent map may be based on
downscaled image data 452 (e.g., a downscaled image or
images corresponding to a slice or slices of a 3D build). The
downscaled image data 452 may be produced by the pro-
cessor and/or received from another device. In some
examples, downscaled image data may not be stored on the
computer-readable medium 448 (e.g., downscaled image
data may be provided by another device or storage device).
In some examples, using a machine learning model to
generate the agent map(s) may be performed as described in
relation to FIG. 1, FIG. 2, and FIG. 3. Agent map generation
may be performed during inferencing and/or training.

In some examples, the computer-readable medium 448
may include training instructions. The training instructions
may include code to cause a processor to determine a loss
(e.g., a loss based on a predicted agent map(s) and a ground
truth agent map(s)). In some examples, determining a loss
may be performed as described in relation to FIG. 1. For
instance, the training instructions may include instructions
to cause the processor to determine a detailing agent loss
component and a fusing agent loss component. In some
examples, the training instructions may include instructions
to cause the processor to determine the loss based on a
masked predicted detailing agent map and a masked pre-
dicted fusing agent map.

The training instructions may include instructions to
cause the processor to train a machine learning model based
on the loss. In some examples, training the machine learning
model based on the loss may be performed as described in
relation to FIG. 1. For instance, the processor may adjust
weight(s) of the machine learning model to reduce the loss.
In some examples, the computer-readable medium 448 may
not include training instructions. For instance, the machine
learning model may be trained separately and/or the trained
machine learning model may be stored in the machine
learning model instructions 450.

In some examples, ground truth agent maps may be
generated. In some examples, a perimeter mask may be
applied to a detailing agent map. The perimeter mask may be
a static mask (e.g., may not change with shape). In some
examples, ground truth agent maps may be expressed as
images without a perimeter mask. While generating ground
truth agent maps, the perimeter mask may not be applied in
some approaches. For instance, unmasked detailing agent
maps may be produced.

Table (1) illustrates different stages with corresponding
input datasets and outputs for some examples of the machine
learning models described herein.

TABLE 1

| Stage | Input Dataset | Output |
|---|---|---|
| Training and/or Testing | Downscaled slice and ground truth agent maps (e.g., ground truth fusing agent maps and ground truth detailing agent maps) | Predicted agent maps (e.g., predicted fusing agent maps and (unmasked) predicted detailing agent maps) (image same size as input) |

16

TABLE 1-continued

| Stage | Input Dataset | Output |
|---|---|---|
| Inferencing | Downscaled slices | Predicted agent maps (e.g., predicted fusing agent maps and predicted detailing agent maps) (image same size as input) |
| Detailing Mask Processing | Downscaled perimeter mask, unmasked predicted detailing agent maps | Masked predicted detailing agent maps |

In some examples, the computer-readable medium 448
may include metric instructions. For example, the computer-
readable medium 448 may include instructions when
executed cause the processor to determine an accuracy
metric. An accuracy metric is a quantity indicating an
accuracy of an agent map (e.g., predicted agent map). For
instance, the accuracy metric may indicate the accuracy of
an agent map(s) relative to a ground truth agent map(s). In
some examples, a first accuracy metric may be determined
for a first agent (e.g., fusing agent) and a second accuracy
metric may be determined for a second agent (e.g., detailing
agent). In some examples, determining an accuracy metric
may be performed during training and/or offline (e.g., not
during inferencing) to indicate machine learning model
prediction accuracy.

In some examples, the processor may determine an accu-
racy metric (e.g., an overall accuracy metric and/or a per-
layer accuracy metric). For instance, the accuracy metric
may be computed by filtering contone values at a level (e.g.,
level 0), computing a frequency at each contone level,
determining a fraction of predicted contone level accuracy
(for each contone level, for instance), and/or by determining
a sum of the fractions of the contone levels to produce the
accuracy metric. A contone level is a pixel value in a contone
image. For instance, a 24-bit contone image may have 256
potential values for each pixel, where each value may be
referred to as a contone level. For example, a contone image
with pixel intensity in the range [4, 10] may have five
contone levels: 4, 5, 6, 7, 8, 9, and 10. A contone "fre-
quency" may refer to how often a contone level occurs in a
group of layers. For instance, a majority of pixels may
represent powder in some cases, and pixels at contone level
0 may be excluded since they may have a relatively high
contone frequency.

In some examples, the processor may compute a first
frequency at each contone level for a fusing agent ground
truth map and a second frequency at each contone level for
a detailing agent ground truth map. In some examples, the
processor may compute an adjusted frequency of a contone
level by removing "empty" pixels (e.g., pixels or voxels
without agent). The adjusted frequency may be useful for
build volumes with regions where agent is not applied. In
some examples, a first adjusted frequency may be deter-
mined for a fusing agent ground truth map and a second
adjusted frequency may be determined for a detailing agent
ground truth map.

In some examples, the processor may compute a fraction
of predicted contone level accuracy. For instance, the pro-
cessor may determine a proportion of predicted contone
levels that match corresponding ground truth contone levels.
In some examples, a first fraction may be computed for a
predicted fusing agent map and a second fraction may be
computed for a predicted detailing agent map. In some
examples, determining a fraction of predicted contone level
accuracy may be performed utilizing a tolerance (e.g., ±3 for
fusing agent and ±5 for detailing agent).

In some examples, the processor may compute a per-level accuracy metric by multiplying the adjusted frequency by the fraction (for the corresponding contone level, for instance). In some examples, the per-level accuracy metric may be computed for each contone level. In some examples, a first per-level accuracy metric may be computed for fusing agent and a second per-level accuracy metric may be computed for detailing agent.

In some examples, the processor may compute an accuracy metric (e.g., overall accuracy metric) by summing the per-level accuracy metrics for the contone levels. In some examples, the processor may compute a first accuracy metric for fusing agent and a second accuracy metric for a detailing agent. The accuracy metric may indicate a quantity (e.g., proportion) of agent that was predicted accurately (for a given agent, for instance).

In some examples, the processor may compute an average error at each contone level (for a first agent and a second agent, etc.). In some examples, the processor may compute a maximum error at each contone level (for a first agent and a second agent, etc.). While some of the techniques are described herein in terms of two agents (e.g., a first agent and a second agent), some examples of the techniques may be performed for a different quantity of agents (e.g., three agents, four agents, etc.). For example, a machine learning model may include n branches corresponding to n agents (e.g., to generate n agent maps). For instance, some examples of the techniques described herein may be performed in approaches for printing electronics, printing circuits, or other printing applications that may utilize more than two agents.

Figure 5:
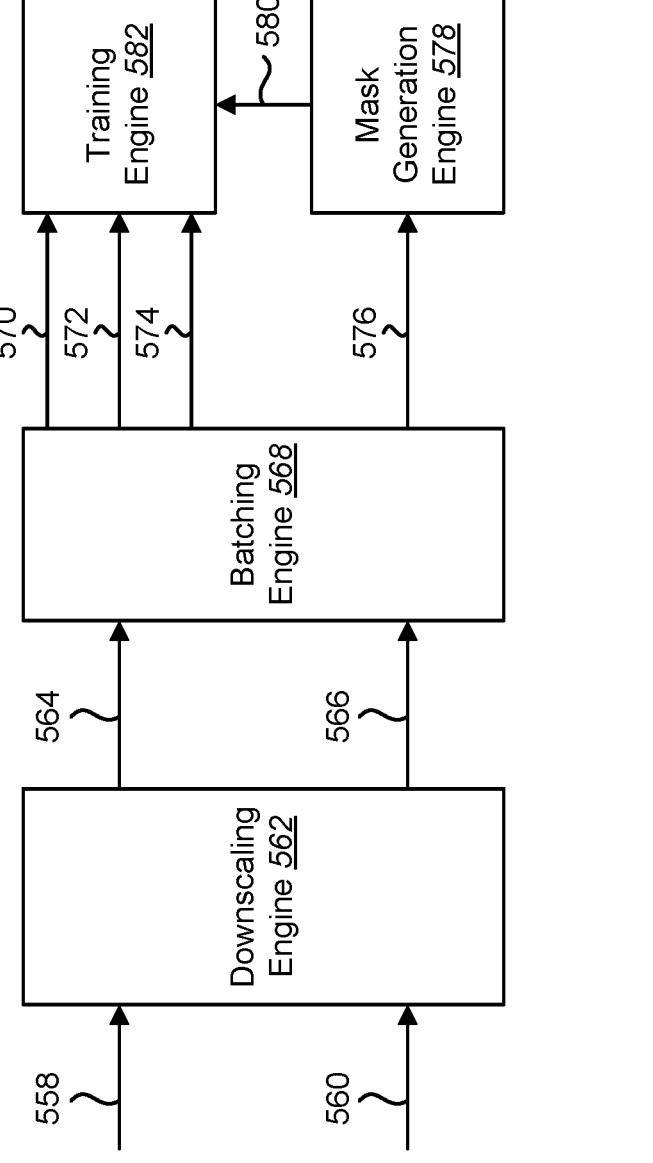
FIG. 5 is a diagram illustrating an example of training.

FIG. 5 is a diagram illustrating an example of training 556. The training 556 may be utilized to train a machine learning model or models described herein. In some examples, the training 556 may be performed by an apparatus (e.g., the apparatus 324 described in relation to FIG. 3). As illustrated in FIG. 5, slice images 558 and agent maps 560 may be downscaled and batched. For example, slice images 558 (with a resolution of 3712×4863 px, for instance) may be provided to a downscaling engine 562, which may produce downscaled slices 564 (with a resolution of 232×304 px, for instance). The downscaled slices 564 may be provided to a batching engine 568. In some examples, the batching engine 568 may sequence and batch the downscaled slices 564 into sequences, samples, and/or batches. For instance, the batching engine 568 may produce a lookahead sequence 570, a current sequence 572, and/or lookback sequence 574. In some examples, lookahead sample batches may have a sample size of two and a sequence size of ten, current sample batches may have a sample size of two and a sequence size of ten, and/or lookback sample batches may have a sample size of two and a sequence size of ten. The batched slice images 570, 572, 574 may be provided to a training engine 582.

In some examples, agent maps 560 (with a resolution of 3712×4863 px, for instance) may be provided to the downscaling engine 562, which may produce (unmasked, for example) downscaled ground truth agent maps 566 (with a resolution of 232×304 px, for instance). For instance, ground truth fusing agent maps and/or ground truth detailing agent maps may be provided to the downscaling engine 562 to produce unmasked downscaled ground truth fusing agent maps and/or unmasked downscaled ground truth detailing agent maps. The downscaled ground truth agent maps 566 may be provided to the batching engine 568. In some examples, the batching engine 568 may sequence and batch the downscaled ground truth agent maps 566 into sequences, samples, and/or batches. For instance, the batching engine 568 may produce batched agent maps 576. In some examples, batched agent maps 576 may have a sample size of two and a sequence size of ten. The batched agent maps 576 may be provided to a mask generation engine 578.

For example, the batched agent maps 576 may be utilized to determine masks 580 for loss computation. For instance, masks 580 may be generated for training engine 582. For instance, the masks 580 may be generated from the (ground truth) batched agent maps 576 (e.g., downscaled ground truth fusing agent maps and/or downscaled ground truth detailing agent maps) using an erosion and/or dilation operation. The masks 580 (e.g., masked ground truth agent map(s), masked ground truth fusing agent map(s), masked ground truth detailing agent map(s)) may be generated to weigh object and object-powder interface pixels higher in the loss computations as a relatively large proportion (e.g., 70%, 80%, 90%, etc.) of pixels may correspond to powder (e.g., non-object pixels). The masks 580 may be different from the perimeter mask described herein. For inferencing, for example, a perimeter mask may be applied to a predicted detailing agent map. In some examples, the perimeter mask may be applied uniformly to all layers and/or may be independent of object shape in a slice. The masks 580 for the loss computation may depend on object shape. In some examples, a mask or masks (of the masks 580) may be selected based on a manufacturing powder type. For instance, an apparatus may obtain an indicator of manufacturing powder type (via an input device and/or user input, for instance), and may select a mask (e.g., no mask, unity mask, or other mask) based on the manufacturing powder type as described herein.

The masks 580 may be provided to training engine 582. The training engine 582 may train a machine learning model based on the batched slice images 570, 572, 574 and the masks 580. For instance, the training engine 582 may compute a loss based on the masks 580, which may be utilized to train the machine learning model.

Figure 6:
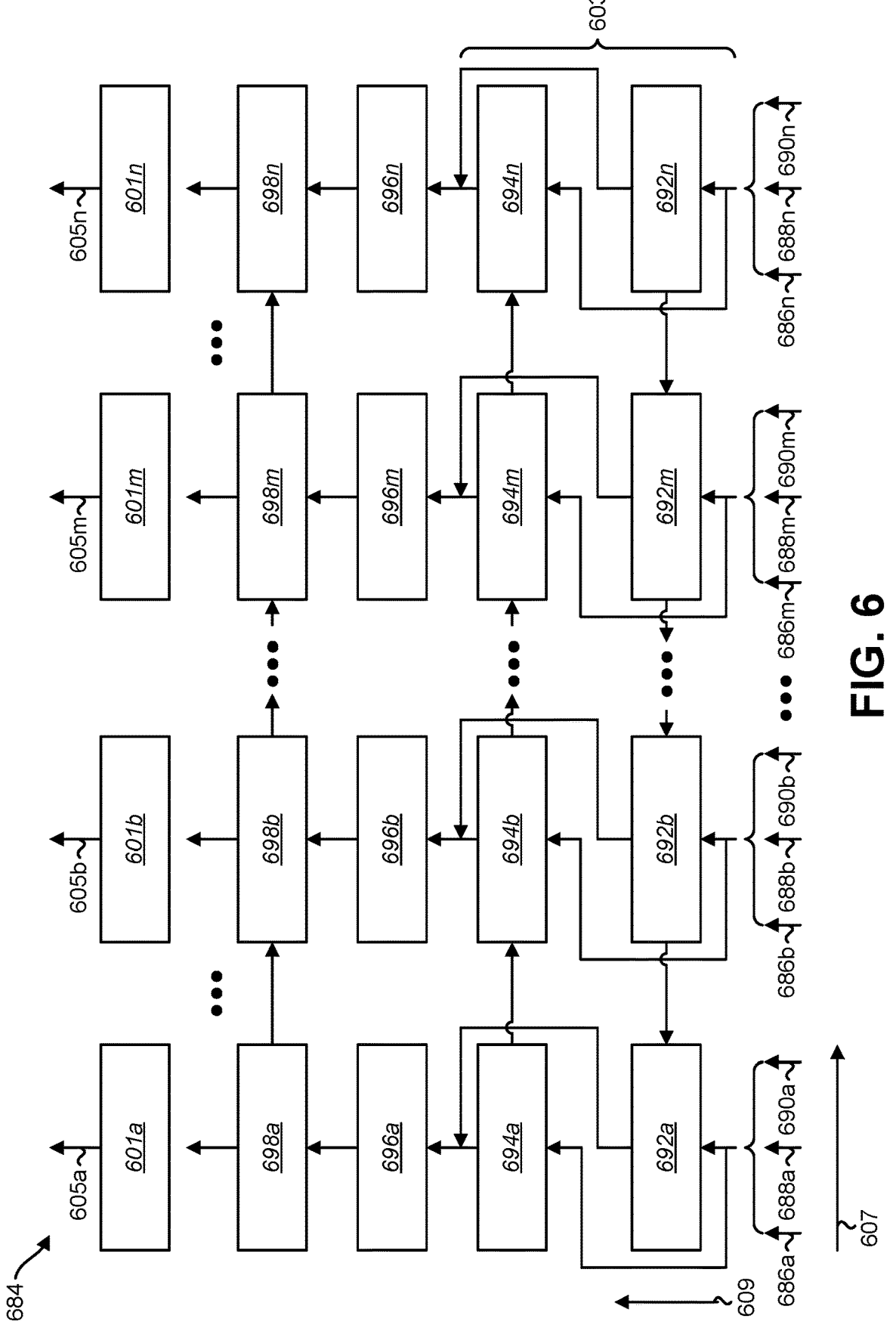
FIG. 6 is a diagram illustrating an example of a machine learning model architecture.

FIG. 6 is a diagram illustrating an example of a machine learning model architecture 684. The machine learning model architecture 684 or a portion(s) thereof (e.g., layer(s)) described in connection with FIG. 6 may be an example of the machine learning model(s) or a portion(s) thereof (e.g., layer(s)) described in relation to one, some or all of FIGS. 1-5 and 8. For instance, a layer or layers of the machine learning model architecture 684 may be arranged into a trunk and/or branches of a machine learning model. For instance, the machine learning model architecture described in relation to FIG. 8 may include a layer or layers described in FIG. 6 in a trunk and/or branches. In some examples, a layer or layers described in FIG. 6 may be included in a separate branch. In some examples, layers corresponding to a batch are provided to the machine learning model structures to produce fusing agent maps and detailing agent maps in accordance with some of the techniques described herein.

In the machine learning architecture 684, convolutions capture spatial relationships amongst the pixels and multiple layers to form a hierarchy of abstractions based on individual pixels. Features may accordingly be represented using stacks of convolutions. LSTM neural networks (e.g., a variant of a recurrent neural network), with gating functions to control memory and hidden state, may be used to capture temporal relationships without the vanishing gradient difficulties of some recurrent neural networks. Combining stacks of convolutions and LSTMs together may model some spatio-temporal dependencies. In some examples, 2D convolutional LSTM neural networks may be utilized. The diagram of FIG. 6 illustrates increasing model depth 609 from the bottom of the diagram to the top of the diagram, and increasing time 607 from the left of the diagram to the right of the diagram.

In the example of FIG. 6, the machine learning model architecture 684 includes model layers of 2D convolutional LSTM networks 692*a-n*, 694*a-n*, 698*a-n*, a batch normalization model layer or layers 696*a-n*, and a model layer of 3D convolutional neural networks 601*a-n*. The machine learning model architecture 684 model takes three sequences (e.g., a lookback sequence 686*a-n*, a current sequence 688*a-n*, and a lookahead sequence 690*a-n*) as input. For example, a lookback sequence 686*a-n* may include slices for layers 1-10 of a batch, a current sequence 688*a-n* may include slices for layers 11-20 of the batch, and a lookahead sequence 690*a-n* may include slices for layers 21-30 of the batch. Respective slices may be input to respective columns of the machine learning model architecture 684 of FIG. 6. Layer outputs may be fed to subsequent model layers as inputs. Each sequence may be unfolded one layer at a time.

At a first model layer of 2D convolutional LSTM networks 692*a-n* and/or a second model layer of 2D convolutional LSTM networks 694*a-n*, a bi-directional wrapper 603 may be utilized to account for dependencies from front to back and back to front within a sequence. Batch normalization 696*a-n* may be performed on the outputs of the first model layer of 2D convolutional LSTM networks 692*a-n* and/or second model layer of 2D convolutional LSTM networks 694*a-n*. The outputs of the batch normalization 696*a-n* may be provided to a third model layer of 2D convolutional LSTM networks 698*a-n*. Outputs of the third model layer of 2D convolutional LSTM networks 698*a-n* may be provided to a model layer of 3D convolutional networks 601*a-n*. In some examples, a different quantity of (e.g., additional) model layers may be utilized between the third model layer of 2D convolutional LSTM networks 698*a-n* and the model layer of 3D convolutional networks 601*a-n*. The layer of 3D convolutional networks 601*a-n* may provide predicted agent maps 605*a-n* (e.g., predicted fusing agent maps and/or detailing agent maps). Lookback and lookahead in the machine learning model architecture 684 may provide context for out-of-sequence dependencies.

In some examples, the quantity of layers may be tuned for GPU memory. For example, kernels used in convolutions and a quantity of layers may be tuned for agent map prediction and/or available GPU memory.

In some examples, the loss function for the machine learning model architecture 684 may be a sum of mean square error (MSE) of agent maps (e.g., fusing agent map and detailing agent map) together with the MSE of the masked agent maps (e.g., masked fusing agent map and masked detailing agent map). In some examples, the mask (e.g., masked agent map) may be derived from the ground truth fusing agent map and detailing agent map. In some approaches, the masked ground truth fusing agent map and masked ground truth detailing agent map (e.g., contone images) are not binary, and thresholds (e.g., $T_{FA}$ and $T_{DA}$, respectively) may be utilized to threshold the masked fusing agent map and/or the masked detailing agent map. In some examples, the thresholds may be derived experimentally.

Figure 7:
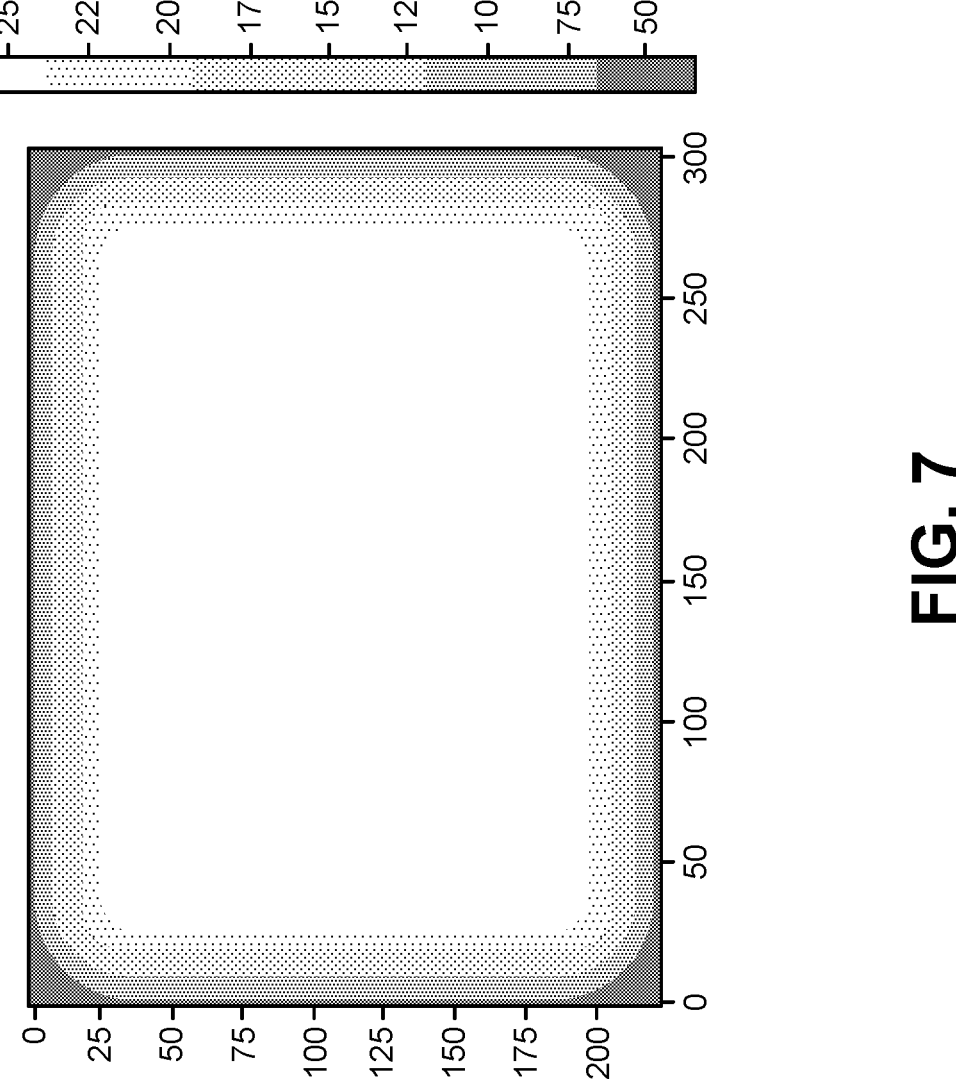
FIG. 7 is a diagram illustrating an example of a perimeter mask in accordance with some of the techniques described herein.

FIG. 7 is a diagram illustrating an example of a perimeter mask 711 in accordance with some of the techniques described herein. The axes of the perimeter mask 711 are given in pixels (e.g., 232×304 px). The degree of the perimeter mask ranges in value from 0 to 255 in this example. The perimeter mask 711 may be multiplied with a predicted detailing agent map to produce a masked detailing agent map in accordance with some of the techniques described herein. For instance, the resulting agent map may be given in the formula: Result= (PredictedDetailingAgentMap*PerimeterMask)/255.

Figure 8:
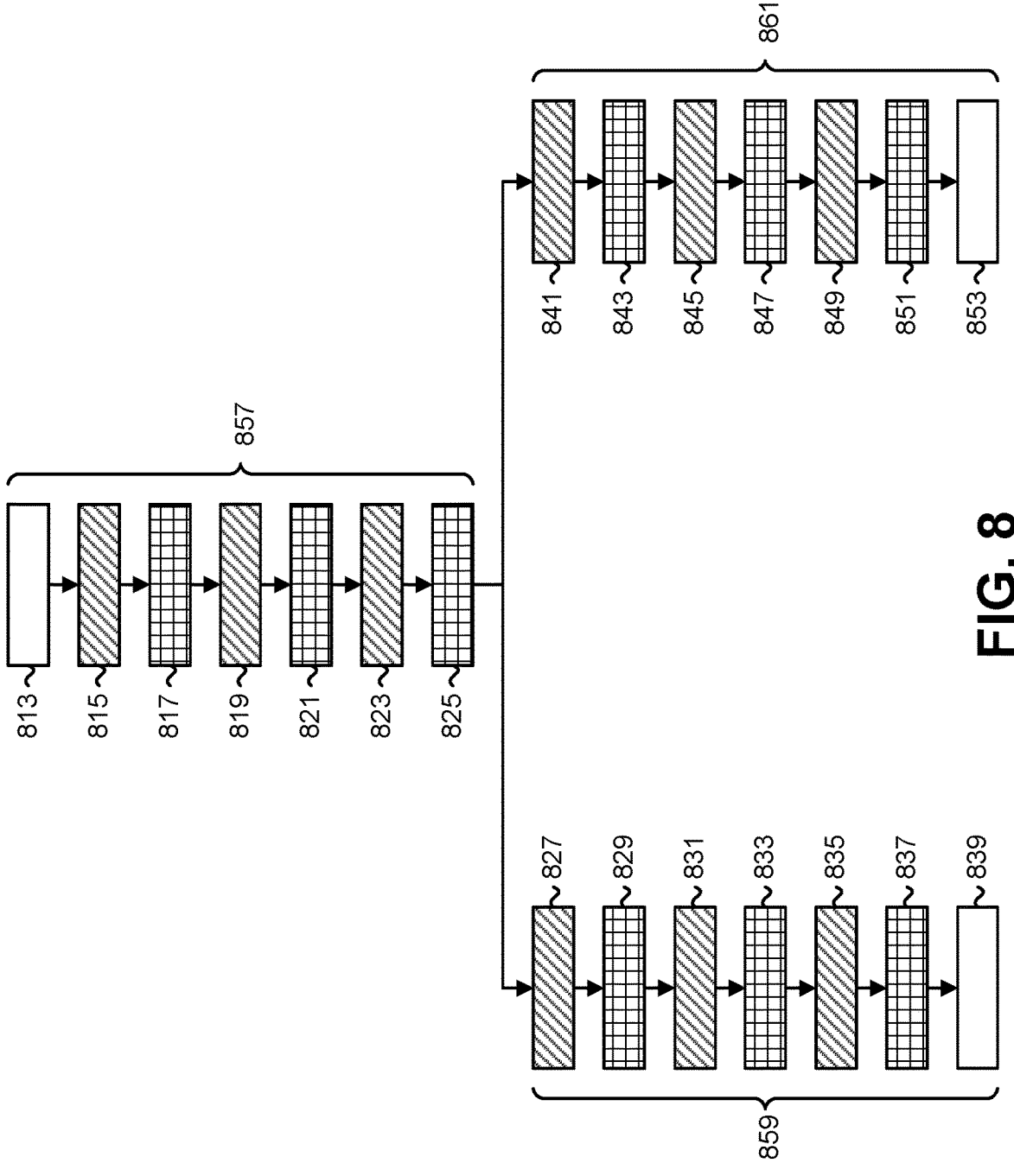
FIG. 8 is a diagram illustrating an example of a machine learning model architecture that may be utilized in accordance with some examples of the techniques described herein.

FIG. 8 is a diagram illustrating an example of a machine learning model architecture 855 that may be utilized in accordance with some examples of the techniques described herein. In this example, the machine learning model architecture 855 includes a trunk 857, a first branch 859, and a second branch 861. The trunk 857 may promote parameter sharing. The first branch 859 and the second branch 861 may promote parameter exclusion. Parameter exclusion between the first branch 859 and the second branch 861 may enhance agent map generation, for different agents. For instance, fusing agent and detailing agent image sequences may have different semantics.

In some examples, a quantity of layers may be tuned for an application type and GPU memory usage. The inputs to the machine learning model may include a current sequence, a lookahead sequence, and a lookback sequence for a total of 30 layers for a batch. In some examples, a batch size of four may be utilized for training. The kernels used in convolutions and the quantity of layers may be tuned for fusing agent map and detailing agent map prediction and the available GPU memory.

In the example of FIG. 8, the trunk 857 may include a first layer 813, a second layer 815, a third layer 817, a fourth layer 819, a fifth layer 821, a sixth layer 823, and a seventh layer 825. In this example, the first layer 813 is an input layer, the second layer 815 is a bidirectional layer (with a bidirectional wrapper structure, for instance), the third layer 817 is a batch normalization layer, the fourth layer 819 is a bidirectional layer, the fifth layer 821 is a batch normalization layer, the sixth layer 823 is a bidirectional layer, and the seventh layer 825 is a batch normalization layer. In some examples, the first layer 813 (e.g., input layer) may include inputs with sizes (10, 232, 304, 3), and may include outputs with sizes (10, 232, 304, 3). In some examples, the second layer 815 (e.g., bidirectional layer) may include inputs with sizes (10, 232, 304, 3), and may include outputs with sizes (10, 232, 304, 20). In some examples, the third layer 817, fifth layer 821, and the seventh layer 825 (e.g., batch normalization layers) may include inputs with sizes (10, 232, 304, 20), and may include outputs with sizes (10, 232, 304, 20). In some examples, the fourth layer 819 and sixth layer 823 (e.g., bidirectional layers) may include inputs with sizes (10, 232, 304, 20), and may include outputs with sizes (10, 232, 304, 20).

In the example of FIG. 8, the first branch 859 may include an eighth layer 827, a ninth layer 829, a tenth layer 831, an eleventh layer 833, a twelfth layer 835, a thirteenth layer 837, and a fourteenth layer 839. In this example, the eighth layer 827 is a bidirectional layer (with a bidirectional wrapper structure, for instance), the ninth layer 829 is a batch normalization layer, the tenth layer 831 is a bidirectional layer, the eleventh layer 833 is a batch normalization layer, the twelfth layer 835 is a bidirectional layer, the thirteenth layer 837 is a batch normalization layer, and the fourteenth layer 839 is a 3D convolutional layer. In some examples, the eighth layer 827 (e.g., bidirectional layer) may include inputs with sizes (10, 232, 304, 20), and may include outputs with sizes (10, 232, 304, 20). In some examples, the tenth layer 831 (e.g., bidirectional layer) may include inputs with sizes (10, 232, 304, 20), and may include outputs with sizes (10, 232, 304, 10). In some examples, the twelfth layer 835 (e.g., bidirectional layer) may include inputs with sizes (10, 232, 304, 10), and may include outputs with sizes (10, 232, 304, 10). In some examples, the ninth layer 829 (e.g., batch normalization layer) may include inputs with sizes (10, 232, 304, 20), and may include outputs with sizes (10, 232, 304, 20). In some examples, the eleventh layer 833 and the thirteenth layer 837 (e.g., batch normalization layers) may include inputs with sizes (10, 232, 304, 10), and may include outputs with sizes (10, 232, 304, 10). In some examples, the fourteenth layer 839 (e.g., 3D convolutional layer) may include inputs with sizes (10, 232, 304, 10), and may include an output with sizes (10, 232, 304, 1).

In the example of FIG. 8, the second branch 861 may include a fifteenth layer 841, a sixteenth layer 843, a seventeenth layer 845, an eighteenth layer 847, a nineteenth layer 849, a twentieth layer 851, and a twenty-first layer 853. In this example, the fifteenth layer 841 is a bidirectional layer (with a bidirectional wrapper structure, for instance), the sixteenth layer 843 is a batch normalization layer, the seventeenth layer 845 is a bidirectional layer, the eighteenth layer 847 is a batch normalization layer, the nineteenth layer 849 is a bidirectional layer, the twentieth layer 851 is a batch normalization layer, and the twenty-first layer 853 is a 3D convolutional layer. In some examples, the fifteenth layer 841, seventeenth layer 845, and nineteenth layer 849 (e.g., bidirectional layers) may include inputs with sizes (10, 232, 304, 20), and may include outputs with sizes (10, 232, 304, 20). In some examples, the sixteenth layer 843, eighteenth layer 847, and twentieth layer 851 (e.g., batch normalization layers) may include inputs with sizes (10, 232, 304, 20), and may include outputs with sizes (10, 232, 304, 20). In some examples, the twenty-first layer 853 (e.g., 3D convolutional layer) may include inputs with sizes (10, 232, 304, 20), and may include an output with sizes (10, 232, 304, 1). In some examples, a different input size(s) and/or different output size(s) for a layer or layers may be utilized in the machine learning model architecture 855. In some examples, layers on different branches may include an input(s) and/or an output(s) with same sizes or different sizes.

In some examples, the first branch 859 and the second branch 861 may have similar architectures. The separation of the first branch 859 and the second branch 861 may allow different weightings for predicting different agent maps. For instance, the first branch 859 may output a fusing agent map and the second branch 861 may output a detailing agent map. Some examples of the machine learning models described herein may include bidirectional wrappers on alternating layers through a portion of the architecture as illustrated in FIG. 8.

Some examples of the techniques described herein may utilize a deep-learning-based machine learning model. For instance, the machine learning model may include a bidirectional convolutional recurrent neural network-based layer or layers (e.g., a bidirectional wrapper beyond a layer adjacent to an input layer). In some examples, ground truth agent maps (e.g., ground truth fusing agent images and/or ground truth detailing agent images) may be utilized to produce masks by applying erosion and/or dilation operations. In some examples, experimentally derived thresholds may be used to binarize the masks. Some examples may apply a perimeter mask (e.g., detailing agent perimeter mask) during inferencing. Some examples may generate an unmasked agent map (e.g., detailing agent map) during training.

In some examples of the techniques described herein, a machine learning model may be utilized to predict both a fusing agent map and a detailing agent map at 18.5 DPI at an average of approximately 32 ms per layer. For instance, agent maps of a build volume may be generated in approximately 150 seconds.

Some approaches to agent map generation may use kernels, lookup tables, and/or per pixel/layer computations to create agent maps for printing. For instance, ground truth agent maps may be computed using kernels, lookup tables, and/or per pixel/layer computations. Some examples of the machine learning models (e.g., neural networks) described herein may accurately learn and recreate these transformations in parallel (using a GPU, for instance), resulting in a significant speed enhancement. The speed enhancement may enable reduced agent map estimation times. Some examples of the techniques described herein may enhance resolution and/or accuracy of predicted agent maps over time.

Some examples of the machine learning architectures described herein may enhance prediction accuracy. Some examples of the machine learning architectures described herein may provide an accelerated deep-learning-based fluid agent prediction engine. Some examples of the machine learning models described herein may include multiple bidirectional wrappers and/or may provide parameter sharing and exclusion in the network to predict agent maps (e.g., fusing agent maps and detailing agent maps) to reflect different semantics for different agents. For instance, a machine learning model may include bidirectional wrappers throughout the layers (for training and/or inference, for example), which may be extensible to different print modes. Some examples of a machine learning model may include separate branches for different agents to promote parameter exclusion.

Some examples of the techniques described herein may provide an accuracy metric to quantify accuracy of agent maps for an entire build. For instance, some examples may provide a contone frequency weighted score for each layer and for the entire build.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be implemented within the scope of the disclosure. For example, aspects or elements of the examples described herein may be omitted or combined.

What is claimed is:

1. A method comprising:
generating a masked ground truth detailing agent map by applying an erosion operation on a ground truth detailing agent map and a masked ground truth fusing agent map by applying a dilation operation on a ground truth fusing agent map;
generating training data by binarizing pixels of the masked ground truth detailing agent map and the masked ground truth fusing agent map;
training a first branch of a machine learning model to predict a first agent map for a fusing agent, and a second branch of the machine learning model to predict a second agent map for a detailing agent based on the training data;
processing a layer image by the first branch of the machine learning model to generate the first agent map for the fusing agent;
processing the layer image by the second branch of the machine learning model to generate the second agent map for the detailing agent, wherein the first agent map and the second agent map indicate printing locations for the fusing agent and the detailing agent; and causing an additive-manufacturing apparatus to additively manufacture an object using the generated first agent map and the generated second agent map.

2. The method of claim 1, wherein the masked ground truth fusing agent map is generated by applying the dilation operation to the ground truth fusing agent map to enlarge a region from an object edge.

3. The method of claim 1, wherein the masked ground truth detailing agent map is generated by applying the erosion operation to the ground truth detailing agent map to reduce a region from an object edge.

4. The method of claim 1, wherein binarizing the masked ground truth detailing agent map comprises setting each pixel of the masked ground truth detailing agent map to a value of 1 or 0, wherein a pixel with a value of 1indicates a pixel intensity at or above a threshold, and a value of 0 indicates that the pixel intensity is below the threshold.

5. The method of claim 1, wherein the fusing agent is an agent that causes a material to fuse when exposed to energy.

6. The method of claim 1, wherein the detailing agent is an agent that reduces fusing.

7. The method of claim 1, wherein the machine learning model is trained based on a masked ground truth agent map.

8. The method of claim 7, wherein a mask is selected based on a manufacturing powder type.

9. The method of claim 1, wherein the machine learning model comprises n branches corresponding to n agents.

10. A system comprising:

a memory to store a layer image; and a processor coupled to the memory, wherein the processor is to perform operations of:

generating a masked ground truth detailing agent map by applying an erosion operation on a ground truth detailing agent map and a masked ground truth fusing agent map by applying a dilation operation on a ground truth fusing agent map;

generating training data by binarizing pixels of the masked ground truth detailing agent map and the masked ground truth fusing agent map;

training a first branch of a machine learning model to predict a first agent map for a fusing agent, and a second branch of the machine learning model to predict a second agent map for a detailing agent based on the training data; and executing the machine learning model to generate by the first branch, the first agent map based on pixels of the layer image, and to generate, by the second branch, the second agent map based on the pixels of the layer image, wherein the machine learning model comprises a trunk shared between the first branch and the second branch.

11. The system of claim 10, wherein the trunk comprises shared parameters and the first branch comprises first parameters that are separate from second parameters of the second branch.

12. The system of claim 10, wherein the first agent map indicates first locations to print the fusing agent and the second agent map indicates second locations to print the detailing agent.

13. The system of claim 10, further comprising an additive-manufacturing apparatus to additively manufacture an object using the generated first agent map and the generated second agent map.

14. A non-transitory tangible computer-readable medium comprising instructions when executed cause a processor of an electronic device to:

generate a masked ground truth detailing agent map by applying an erosion operation on a ground truth detailing agent map and a masked ground truth fusing agent map by applying a dilation operation on a ground truth fusing agent map;

generate training data by binarizing pixels of the masked ground truth detailing agent map and the masked ground truth fusing agent map;

training a first branch of a machine learning model to predict a first agent map for a fusing agent, and a second branch of the machine learning model to predict a second agent map for a detailing agent based on the training data;

generate the first agent map for the fusing agent using the first branch of the machine learning model, and the second agent map for the detailing agent using the second branch of the machine learning model wherein the first agent map and the second agent map are based on pixels of a downscaled image of a slice of a three-dimensional (3D) build; and cause an additive-manufacturing apparatus to additively manufacture an object using the generated first agent map and the generated second agent map.

15. The non-transitory tangible computer-readable medium of claim 14, further comprising instructions that when executed cause the processor to train the machine learning model based on a loss.

16. The non-transitory tangible computer-readable medium of claim 14, further comprising instructions that when executed cause the processor to determine an accuracy metric.

* * * * *